R. L. DEZENDORF.
MEANS FOR TESTING GAS METERS.
APPLICATION FILED NOV. 9, 1916. RENEWED JAN. 3, 1919.
1,306,659.
Patented June 10, 1919.
2 SHEETS—SHEET 1.
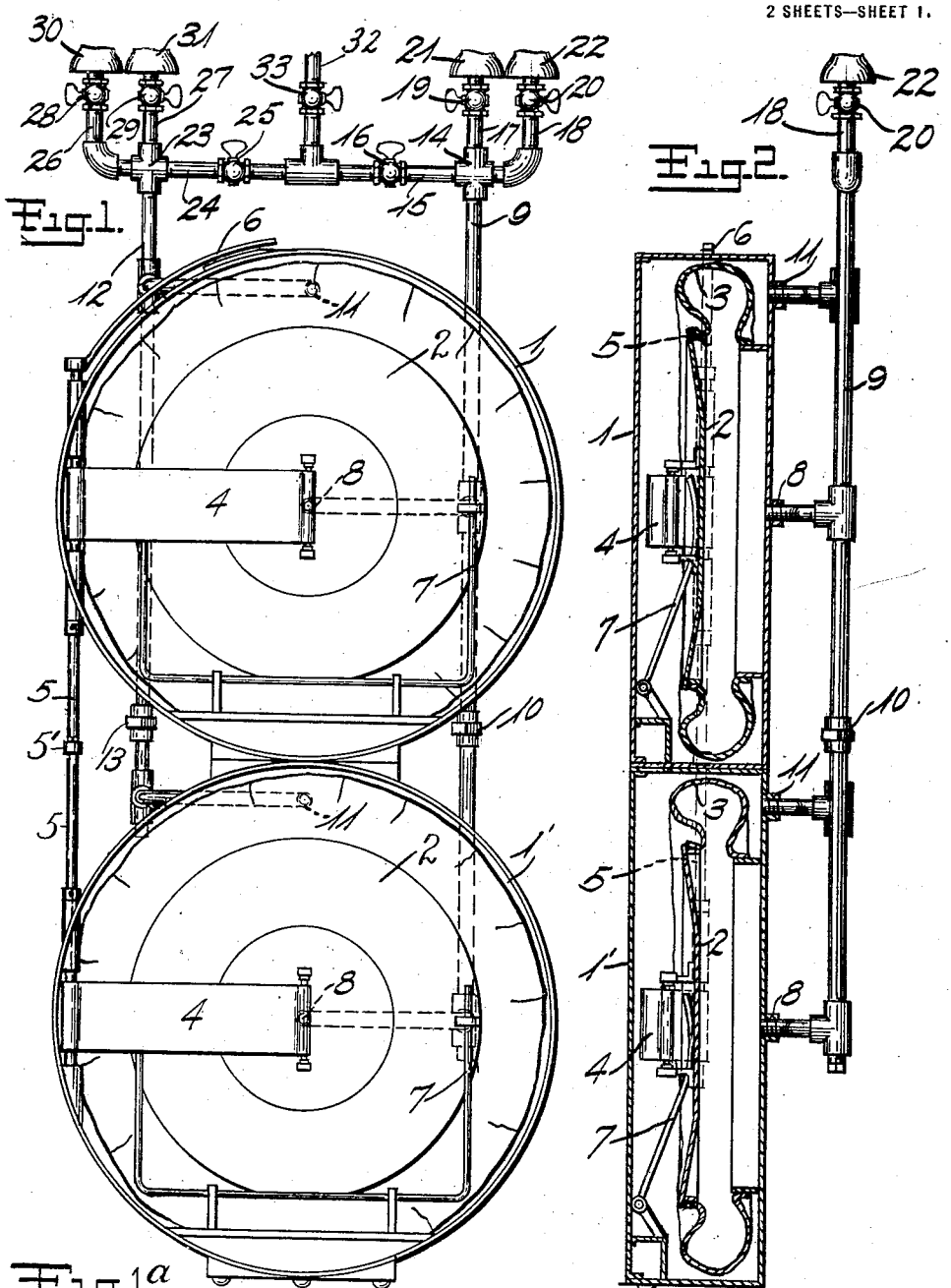
Inventor
R. L. Dezendorf
By his Attorneys
Bartlett & Knowles.

R. L. DEZENDORF.
MEANS FOR TESTING GAS METERS.
APPLICATION FILED NOV. 9, 1916. RENEWED JAN. 3, 1919.
1,306,659.
Patented June 10, 1919.
2 SHEETS—SHEET 2.
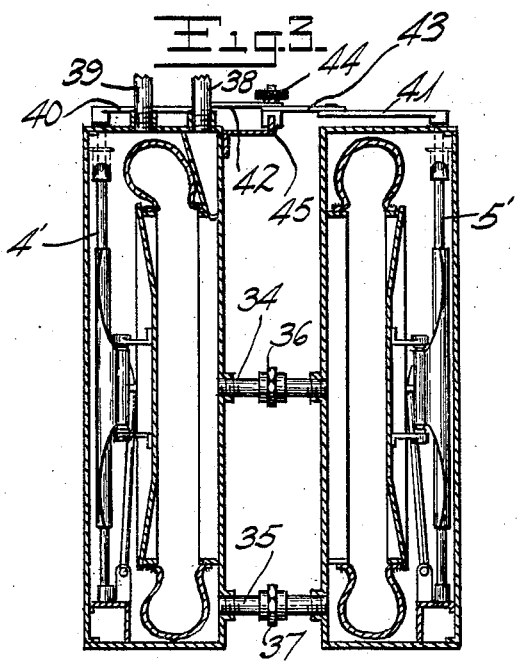
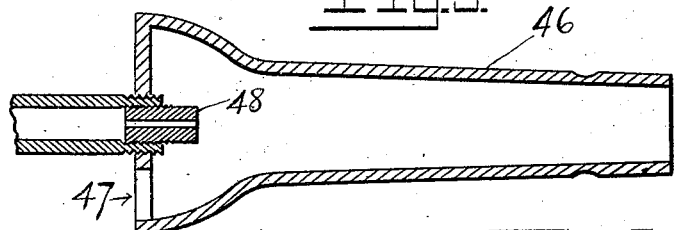
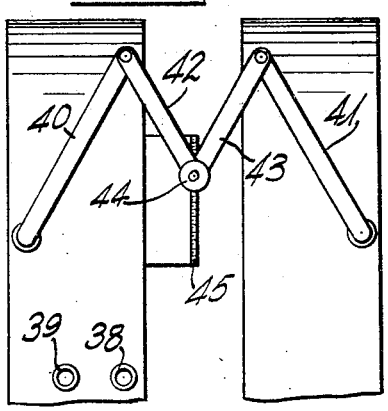
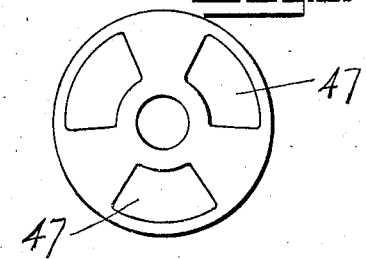
Inventor
R. L. Dezendorf
By his Attorneys

UNITED STATES PATENT OFFICE.

RICHARD LEE DEZENDORF, OF RICHMOND HILL, NEW YORK.

MEANS FOR TESTING GAS-METERS.

1,306,659.  Specification of Letters Patent.  Patented June 10, 1919.

Application filed November 9, 1916, Serial No. 130,318. Renewed January 3, 1919. Serial No. 269,547.

*To all whom it may concern:*

Be it known that I, RICHARD L. DEZENDORF, a citizen of the United States, residing at Richmond Hill, in the county of Queens, State of New York, have invented certain new and useful Improvements in Means for Testing Gas-Meters, of which the following is a full, clear, and exact description.

My invention relates to improvements in means for testing gas meters and has for its object to provide a new and improved gas meter testing means. It further has for its object to provide a means for testing meters of either small or large capacity, which means can be divided into units that can be easily carried about.

The following is a description of an embodiment of my invention, reference being had to the accompanying drawings, in which—

Figure 1 shows my apparatus with the fronts of the measuring devices removed;

Fig. 1ᵃ is a detail of a flag;

Fig. 2 shows a section of the same with the fronts in place;

Fig. 3 shows a modification of the device;

Fig. 4 shows a plan view of the indicating means of the device of Fig. 3;

Fig. 5 shows one of the blue flame burners used in connection with my apparatus; and Fig. 6 shows an end view of the burner.

Referring more particularly to the drawings, 1—1' are two separable measuring devices, the same consisting of gas tight casings, each having therein a flexible wall consisting of a disk 2 and bellows 3 secured to said disk and to the rear wall of the casing. To each disk is pivotally connected a flag 4 which is rigidly connected to a flag wire 5. The upper flag wire 5 is separably connected to the lower flag wire 5 by an angular alining projection and socket 5', whereby the angular position of the two flag wires is always maintained the same and the flexible walls are caused to begin and end their movements simultaneously. To the upper end of the upper flag wire is fastened an indicator 6 which moves in proximity to a graduated scale so that the position of the indicator 6 can be readily read. The disks of the two testing devices are guided by pivoted guide wires 7.

The flexible walls divide the casings of each measuring unit into two separate chambers. The chambers on the inside of these walls are provided with ports 8 which are connected with the pipe 9, said pipe having a separable coupling 10. The chambers outside the flexible walls are provided with ports 11, which are connected to a pipe 12, also provided with a separable coupling 13. The pipe 9 enters a four-way coupling 14 to which leads a supply pipe 15 provided with a stop cock 16, and from which lead discharge pipes 17 and 18 provided with cocks 19 and 20 respectively and terminating in blue flame burners 21 and 22, the burner 21 being of large capacity. The burner 22 is of small capacity and constitutes a small load upon the meter to be tested. In a similar manner, the pipe 12 enters a four-way coupling 23 to which leads a supply pipe 24 having a stop cock 25 and from which lead discharge pipes 26 and 27 provided with stop cocks 28 and 29 and terminating respectively in blue flame burners 30 and 31, 30 being a large burner and 31 a small burner. Connected to the supply pipes 15 and 24 between the stop cocks 16 and 25 is a pipe 32 leading from the discharge of the meter to be tested and provided with a cock 33.

In operating my above described apparatus to test a meter *in situ*, the supply pipe 32 is first connected to the discharge of the meter to be tested. The cocks 16, 28 and 29 are then closed and the cocks 19, 20 and 25 are opened. The cock 33 is then opened with the result that gas flows into the outside chamber in each of the testing units, causing the indicator hand 6 to move toward one of the initial positions. When it has nearly reached one of those positions, the cock 19 is closed and the remainder of the traverse completed, with the cock 20, which is discharging a small load, open. When the traverse is completed, the cock 20 is closed. This places the indicator of the testing apparatus in proper relation for the test. The cocks 16, 28 and 29 are then opened and gas is permitted to pass from the meter directly through the cock 25, to the burners 30 and 31 until the first or test hand upon the indicating dial of the meter to be tested has nearly reached one of its graduation marks, whereupon the cock 28 is closed and the meter to be tested is permitted to run under a small load until the first indicating hand coincides with the graduation mark, whereupon the cocks 25, 29 and 33 are closed. The meter to be tested and testing apparatus are now both in position for the beginning of the actual test. Under these circumstances, the cocks 28 and 29 are opened and the cocks 16 and then 33 are opened, whereupon the gas flows into the interior chambers of the testing units and gas is discharged from the exterior chambers of the testing units through the burners 30 and 31. This condition is maintained until the indicator 6 has traversed about three-fourths of its traverse, whereupon the cock 28 is closed so as to cut off the large burner and the remainder of the traverse is completed with gas discharging through the small burner 31. When the traverse is completed, the cocks 29 and 16 are closed, whereupon the cocks 25, 19 and 20 are opened, with the result that gas enters the exterior chamber through ports 11 and discharges from the interior chambers to the ports 8 and burners 21 and 22, and the indicator hand 6 moves in the opposite direction. When this indicator hand has completed about three-fourths of its movement in this direction, the cock 19 is closed and the hand 6 is permitted to complete its traverse, the gas discharging through the small burner 22. As soon as it has completed this traverse, the cocks 20 and 25 are closed. The two measuring units have such dimensions that when the indicating hand 6 has made a traverse in either direction a certain definite amount of gas will be discharged from each of the two indicating units, such for instance as one cubic foot making in all ten cubic feet to five traverses, that being the amount which is ordinarily registered by large sized gas meters in one revolution of their first hands. If, when the hand 6 has completed the necessary traverses, say five for a ten foot test, the meter to be tested registers ten feet, the test shows that the meter to be tested is accurate. If, however, the meter to be tested registers less than ten feet, it shows that the meter to be tested is running slow and vice versa. The use of the large discharge ports materially shortens the length of the test, while the independent use of the small discharge ports enables defects which are only apparent under small load to be readily detected and it is such defects which are the source of greatest loss.

The gas escaping from the blue flame burners is, of course, ignited in any suitable manner, with the result that the amount of soot deposited and unburned gas discharged is reduced to a minimum. The upper unit can be used separately from the lower unit by disconnecting the flag wires at the coupling 5' and the pipes 9 and 12 at the couplings 10 and 13 and properly sealing the lower ends of the upper portions of the pipes 9 and 12 at those couplings. The upper unit when so separated can be used for testing meters of small capacity, whose first indicating hands register two cubic feet, this being one of the chief advantages of my construction. The two separable units can also be separated for the purpose of carrying them from one point to another, which is another of the chief advantages of my construction. My testing means, therefore, is very flexible, being adapted to test small sized meters or large sized meters and also being easily carried from one point to another.

Fig. 3 shows a modification of the two units in which the same are placed back to back, the inner chambers being connected together and the outer chambers being connected together by pipes 34 and 35, provided with couplings 36 and 37. The inner and outer chambers are provided with pipes 38—39 connecting them through the four-way couplings 14 and 23 to pipes acting to either supply gas to or discharge gas from the inner and outer chambers of one of said units in the manner above described and hence the inner and outer chambers of both of said units. In this modified arrangement the flag wires have to be provided with suitable means for coördinating and indicating their movements and I have shown a suitable means for this purpose in Fig. 4, the same consisting of two arms 40—41 rigidly connected to the upper ends of the flag wires 4'—5' and lower arms 42 and 43 pivotally connected to the upper arms and to a moving indicating device 44 which slides along a graduated scale 45 carried by the unit to which the inlet and discharge pipes 38 and 39 are connected. In this device also, the units can be separated by disconnecting the couplings 36 and 37 and the arm 43 and then the left hand unit, when its pipes 34 and 35 are closed, can be used independently of the others for testing meters of small capacity.

The blue flame burners are of the ordinary type consisting of a shell 46 having an air inlet 47 and a perforated plug 48 the perforation of which is made large or small according to the desired capacity.

The flag wires 5, of Figs. 1 and 2 are located in planes which pass through the centers of the sides of the casings 1 and the flags 4 are L-shaped as shown in plan in Fig. 1ª with the result that there is a side thrust and pull of the flags upon the disks 2 for each of their movements, in either direction, the thrust and pull being in substantially opposite directions, and each being of about one-half the length of the thrust that would be produced if the flags were straight and the flag wires were in the front part of the casings. The length of the movements of the disks 2 due to side thrusts is thereby reduced so that the length of their forward and backward movements can be increased without interfering with the action of the guide wires 7. This is of particular value in my testing means where a long throw of the flexible wall is desirable.

As will be evident to those skilled in the art my invention permits of various modifications without departing from the spirit thereof or the scope of the appended claims.

What I claim is:

1. In an apparatus for testing meters, the combination of two separable measuring units, an indicator jointly controlled by both of said units, and means for connecting both of said units to the discharge of the meter to be tested and to gas consuming means.

2. In an apparatus for testing meters, the combination of two separable measuring units, an indicator jointly controlled by both of said units, and means for connecting both of said units to the discharge of the meter to be tested and to gas consuming means, one of said units being separable from said indicator and from said gas supply and gas consuming means.

3. In a meter testing apparatus, the combination of two measuring units adapted to be placed one on top of the other, two flag wires in line with one another and adapted to be connected together between said measuring units so as to maintain a fixed angular relation to one another, and an indicator connected to one of said flag wires, a flag in each of said units connected to one of said flag wires, and a flexible wall in each of said units, dividing the casing thereof into two chambers, said wall being connected to the flags within said casings, and means for supplying gas to the inner chambers of said casings simultaneously and discharging gas from the outer chambers of said casings, and vice versa.

4. In a meter testing apparatus, the combination of a casing, a flexible wall dividing the interior of said casing into two separate chambers, a port opening into each of said chambers, a supply pipe and two discharge devices having burners connected to said ports respectively, means for connecting said supply pipe to either of said ports and means for cutting off the burners of said discharge devices.

5. In a meter testing apparatus, the combination of a casing, a flexible wall dividing the interior of said casing into two separate chambers, an indicating device actuated by said flexible wall, said chambers having each a port, means for supplying gas connected to said ports, means for discharging gas also connected to said ports, and means for cutting off the supply to either port and the discharge from the other port, without interfering with the supply to said second or discharge from said first port.

6. In a meter testing apparatus, the combination of a casing, a flexible wall dividing the interior of said casing into two separate chambers, an indicating device actuated by said flexible wall, said chambers having each a port, three pipes each connected to both of said ports and to each other and valves in all of said pipes and means for cutting off one of said pipes from either of said ports without interfering with its connection with the other of said ports, said means simultaneously cutting off one of the other two pipes from the other port.

7. In a meter testing apparatus, the combination of a casing, a flexible wall dividing the interior of said casing into two separate chambers, an indicating device actuated by said flexible wall, said chambers having each a port, three pipes, each connected to both of said ports and to each other, valves in all of said pipes, and means for cutting off one of said pipes from one of the other pipes and one of said ports or from the other of said other pipes and the other of said ports, and gas consuming means for gas discharged.

8. In a means for testing gas meters, the combination of two testing units composed of casings, each having a movable wall dividing its casing into two separate chambers, each chamber in one of said casings being connected to a chamber in the other casing, and means for compelling said walls to simultaneously begin and end their movements, an indicator actuated by such movements, and means for supplying gas to either of said chambers and discharging it from the other.

RICHARD LEE DEZENDORF.

Copies of this patent may be obtained for five cents each, by addressing the "Commissioner of Patents, Washington, D. C."